Patented Jan. 25, 1927.

1,615,239

UNITED STATES PATENT OFFICE.

FRANCIS H. SHERRERD, OF EAST ORANGE, NEW JERSEY.

PIPE JOINT.

Application filed December 7, 1922. Serial No. 605,333.

This invention relates to pipe-joints; and the invention has reference, more particularly, to an improved expansion and contraction joint for cast concrete pipe, conduits and similar structures.

This invention has for its principal object to provide a novel construction of pipe or conduit joint between adjacent sections of pipe or conduit which, under variations of temperature tending to cause expansion or contraction of the pipe or conduit, will not produce undue strains or stresses resulting in breakage of the bells or spigots at the pipe or conduit ends and the consequent development of cracks or bad leaks.

The invention has for a further object to provide the adjoining ends of pipe or conduit sections with a novel construction of mutually cooperating bell and spigot portions so shaped that, when cooperatively related, an annular space of wedge or key-stone shape is provided between the bell and spigot, one side of which is parallel with the longitudinal axis of the pipe or conduit, and into which space may be introduced or cast a mortar sealing material without requiring the use of an internal sealing band to hold the wet mortar from escaping into the interior of the pipe when making the joint, thus eliminating the expense and tedious labor incident to the use of such sealing bands. The invention further contemplates the provision of a coating of asphalt or similar material on the longitudinally or similar material on the longitudinally straight side or internal face of said space between the bell and spigot of adjoining pipe or conduit sections; this coating being adapted to prevent the mortar seal from bonding to the straight side of said space so that either the bell or spigot forming such straight side (as the case may be) may slip longitudinally under the stresses of expansion or contraction of the pipe or conduit, while the mortar seal nevertheless maintains a tight joint by reason of the exactness of its fit relative to such coated straight surface.

Other objects of this invention, not at this time more particularly enumerated, will be clearly understood from the following detailed description of the same.

With the objects of the invention in view, the same consists, primarily, in the novel construction of joint for pipe or conduit sections hereinafter set forth; and the invention consists, furthermore, in the novel arrangements and combinations of the various devices and parts, as well as in the details of the construction of the same, all of which will be hereinafter more fully described, and then finally embodied in the claim appended hereto.

The invention is clearly illustrated in the accompanying drawings, in which:—

Figure 1:
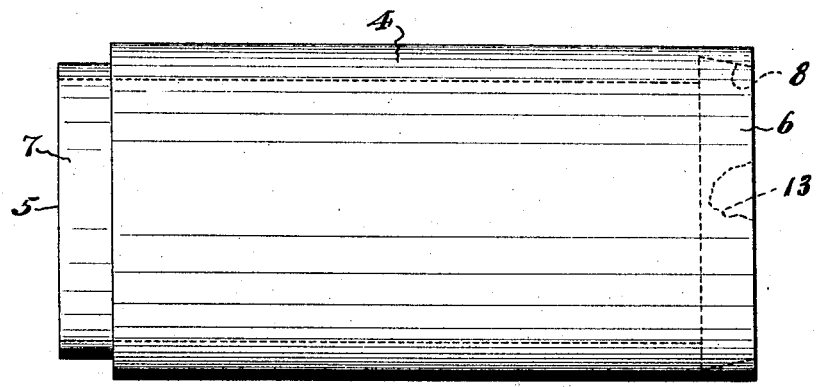
Figure 2:
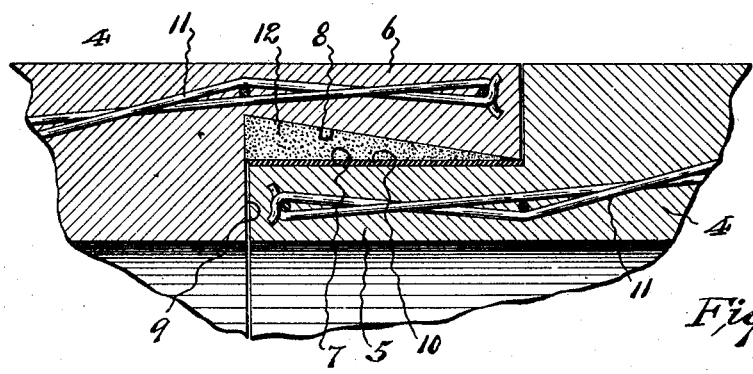
Figure 3:
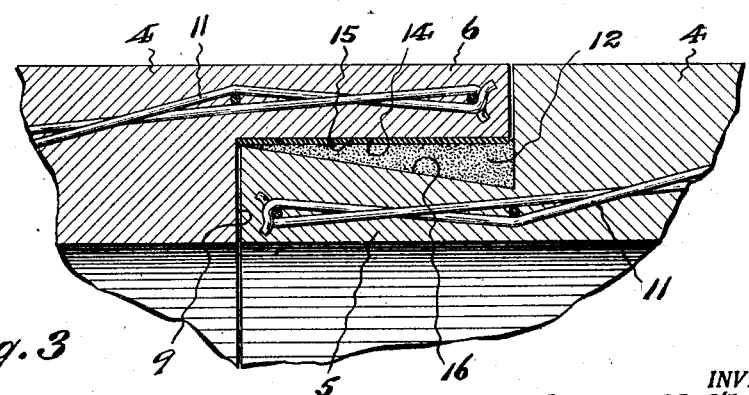

Figure 1 is a side elevation of a pipe or conduit section provided with the novel construction of bell and spigot ends made according to and embodying the principles of this invention; Figure 2 is an enlarged fragmentary longitudinal section taken through the joint formed between the cooperating bell and spigot ends of adjoining pipe or conduit sections, but showing the spigot shaped to provide the straight side of the mortar receiving space provided between the bell and spigot, while the bell is shaped to provide the angular side of said space; and Figure 3 is a view similar to that shown in Figure 2, but showing the bell shaped to provide the straight side of the mortar receiving space provided between the bell and spigot, while the spigot is shaped to provide the angular side of said space.

Referring now to Figures 1 and 2 of said drawings, each pipe or conduit section 4 is provided at one end with a spigot portion 5 and at its opposite end with a bell portion 6. When two pipe or conduit sections are longitudinally alined end to end so as to be joined together, the spigot portion of one pipe or conduit is opposed to the bell portion of the adjoining pipe or conduit section, so that the latter will receive the former, the spigot portion telescoping into the bell portion. In the form of joint illustrated in Figures 1 and 2, the outer surface of the spigot portion 5 is straight, i. e. the surface is parallel to the longitudinal axis of the pipe or conduit section, thus providing what I have herein referred to as a straight side; the inner surface 8 of the bell portion 6, however, is undercut to incline rearwardly and outwardly from the free end of the bell portion to the base thereof, thus providing what I have herein referred to as an angular side. The diameter of the bell opening at the free end of the bell portion 6 corresponds approximately to the diameter of the spigot portion 5, being but enough larger to permit of easy entrance of said spigot portion 5 into the bell portion 6; and the spigot portion 5 and bell portion 6 are approximately of the same length. When the spigot portion 5 and bell portion 6 are telescopically engaged together, an internal annular enclosed space or chamber is established between the spigot and bell portions which is of wedge or key stone cross-sectional shape, and which widens out from the outer end of the bell portion toward the inner end of the same, such enclosed space or chamber being bounded by the converging straight and angular sides 7 and 8 and by the end 9 of the pipe or conduit from which the bell portion 6 springs. The straight side 7 of the spigot portion 5 is preferably coated with a layer or skin 10 of asphalt, asphalt paint or some suitable material which will not bond with wet mortar or the like.

The pipe or conduit sections 4 constructed with bell and spigot portions as above described are capable of being cast or molded from concrete or the like, and by reason of the simple lines of the bell and spigot shapes, such practice is rendered comparatively simple and cheap to carry out, since the forms for such bell and spigot portions may be made of sheet metal in two or three sections, which being of light weight may be handled more expeditiously and with less labor, than are cast iron forms usually required for such portions of concrete pipe or conduits. It will be understood, however, that I do not limit the novel joint construction and arrangement for use with cast or molded concrete pipe or conduits only, since the novel features thereof may be applied to pipe or conduit made of metallic, wooden, vitreous or other material. If the pipe or conduit sections are made of cast or molded concrete, the same may be provided with any form of internal reenforcement heretofore commonly employed, such as the wire mesh reenforcing elements 11 shown in the drawings.

When the adjoining pipe or conduit sections are alined and the spigot portion 5 of the one is telescopically entered within the bell portion 6 of the other, so that the free end of the spigot portion 5 abuts the end 9 of the adjoining pipe or conduit section, a sealing joint may be made by filling the internal annular space or chamber between spigot and bell with a plastic material 12 such as cement, mortar, grout or the like. In order to give access to said enclosed annular space or chamber, a portion of the bell 6 may be broken away, as indicated by the dotted line 13 in Figure 1, to thus afford an opening through which the plastic material may be poured or otherwise introduced. The plastic material is thus caused to enter and fill up the entire space or chamber, as illustrated in Figure 2 thereby sealing the joint. The plastic material while flowing into the internal space or chamber cannot escape into the interior of the pipe or conduit, because the spigot portion is in substantially abutting relation to the end 9 of the opposite pipe or conduit section from which the bell portion 6 springs. This feature is of very great importance and advantage, since by reason thereof all necessity for the workmen to enter the interior of the pipe or conduit and fit sealing bands around the inner surface thereof to close the mortar receiving space is avoided, thereby saving a great amount of time and labor, and also rendering it possible to employ the novel joint construction in pipes or conduits of a diameter too small to permit of a workman's entrance thereinto. The plastic material will bond itself to the angular side 8 of the bell portion 6, but, although fitting itself accurately to the straight side 7 of the spigot portion 5, will not bond itself to the latter because the coating 10 of asphalt or the like is bond resisting. It therefore follows that longitudinal strains or stresses due to expansion or contraction of the pipe or conduit sections will be compensated by a slippage of the spigot portion 5 relative to the mass of sealing material without tendency to strain or crack the latter, and since the contact of said mass of sealing material with the spigot portion 5 is practically perfect, the joint will remain tight and substantially leak-proof notwithstanding such permitted slippage. The angular side 8 as opposed to the straight side 7 of the mortar receiving space, assures the proper retention of the sealing material within the bell-portion 6, such retention being further assured by reason of the fact that the sealing material will establish a bond with the bare surface of the bell-portion with which it engages.

Referring now to Figure 3 of the drawings, I have shown therein, as an alternative arrangement in the formation of my novel joint for pipe or conduit, the bell-portion 6 provided at its internal surface with a straight side 14 coated with a cover or skin 15 of asphalt or the like, while the spigot portion 5 is undercut to incline rearwardly and outwardly from the free end to the base thereof to thereby provide an angular side 16. When the spigot portion 5 and bell portion 6 are telescopically fitted together, said straight side 14 and angular side 16 will bound an enclosed internal space or chamber adapted to receive a sealing material 12, such as cement, mortar, grout or the like. It will be apparent without repetition that the functioning and advantages relative to the form of joint as thus modified is substantially the same as already above described in connection with the specific structure shown in Figures 1 and 2; in fact there is but a reversal of the shape of spigot and bell, whereby the bell possesses the straight internal surface unbonded with the sealing material whereby longitudinal slippage between said bell and the sealing material may compensate for the longitudinal strains and stresses of expansion or contraction, while the spigot possesses the angular internal surface bonded to the sealing material for retaining the latter in place.

Having thus described the invention, I claim:—

An expansion and contraction joint for concrete pipes comprising adjoining pipe sections, one pipe section having a spigot member and the other pipe section having a bell member shaped to provide an internal enclosed space intermediate the same, said space being bounded on one side by a straight face parallel to the longitudinal axis of the pipe sections and on the other side by an angular face converging at its outer extremity upon said straight face, a cement sealing body filling said internal enclosed space, said cement sealing body being bonded to said angular face, and said straight face having a coating of asphalt substance adapted to prevent said cement sealing body from bonding thereto.

In testimony that I claim the invention set forth above I have hereunto set my hand this 21st day of November, 1922.

FRANCIS H. SHERRERD.